(12) United States Patent
Leben et al.

(10) Patent No.: US 6,814,348 B1
(45) Date of Patent: Nov. 9, 2004

(54) TRACTION/COMPRESSION BUFFER FOR COUPLING DEVICES ON RAIL AND WHEEL-MOUNTED VEHICLES

(76) Inventors: Klaus Leben, Max-Reger-Str. 7, Berg (DE), D-82335; Bernhard Starker, Schongauerstr. 30, D, 86987 Schwabsoien (DE)

( * ) Notice: Subject to any disclaimer, the term of this patent is extended or adjusted under 35 U.S.C. 154(b) by 0 days.

(21) Appl. No.: 09/958,482
(22) PCT Filed: Apr. 14, 2000
(86) PCT No.: PCT/EP00/03382
§ 371 (c)(1),
(2), (4) Date: Feb. 6, 2002
(87) PCT Pub. No.: WO00/65248
PCT Pub. Date: Nov. 2, 2000

(30) Foreign Application Priority Data

Apr. 22, 1999 (DE) .......................................... 199 18 195

(51) Int. Cl.[7] .............................. F16F 9/00; F16F 9/342
(52) U.S. Cl. ....................... 267/217; 267/116; 188/314; 213/43
(58) Field of Search ................................ 267/195, 196, 267/216, 217, 225, 226, 221, 115, 118, 124, 126, 116, 113; 213/223, 43, 44, 45, 46 R; 188/289, 297, 313, 314, 316, 317, 288

(56) References Cited

U.S. PATENT DOCUMENTS

| | | | | |
|---|---|---|---|---|
| 2,404,931 A | * | 7/1946 | Somervell | 267/226 |
| 2,994,442 A | * | 8/1961 | Frederick | 267/217 |
| 3,378,149 A | * | 4/1968 | Powell | 213/43 |
| 3,647,239 A | * | 3/1972 | Katsumori | 188/317 |
| 3,729,101 A | | 4/1973 | Brambilla et al. | |
| 4,428,567 A | * | 1/1984 | Fournales | 188/317 |
| 5,160,123 A | | 11/1992 | Danieli | |
| 5,927,523 A | | 7/1999 | Huggins et al. | |
| 6,467,593 B1 | * | 10/2002 | Corradini et al. | 188/289 |

FOREIGN PATENT DOCUMENTS

| | | |
|---|---|---|
| DE | 3311549 | 4/1984 |
| GB | 1266596 | 3/1972 |
| GB | 2312659 | 11/1997 |

* cited by examiner

*Primary Examiner*—Thomas Williams
(74) *Attorney, Agent, or Firm*—Katten Muchin Zavis Rosenman

(57) ABSTRACT

A traction/compression buffer for coupling devices on rail and wheel-mounted vehicles comprises a housing (1) and a piston element (3), which projects out of said housing on one side and which can be moved out of a zero position in two directions against the resistance of a spring device and a damping device. A hydraulic damping device is provided for damping the return movement of the piston element (3) out of the position in which it is drawn out of the housing (1) in the direction of the zero position. Said hydraulic damping device comprises a ring-shaped hydraulic working chamber (32) that surrounds the piston element (3) and that is connected to an overflow chamber (29) by at least one overflow channel (31).

9 Claims, 4 Drawing Sheets

Detail X

Detail Y

Figure 1:
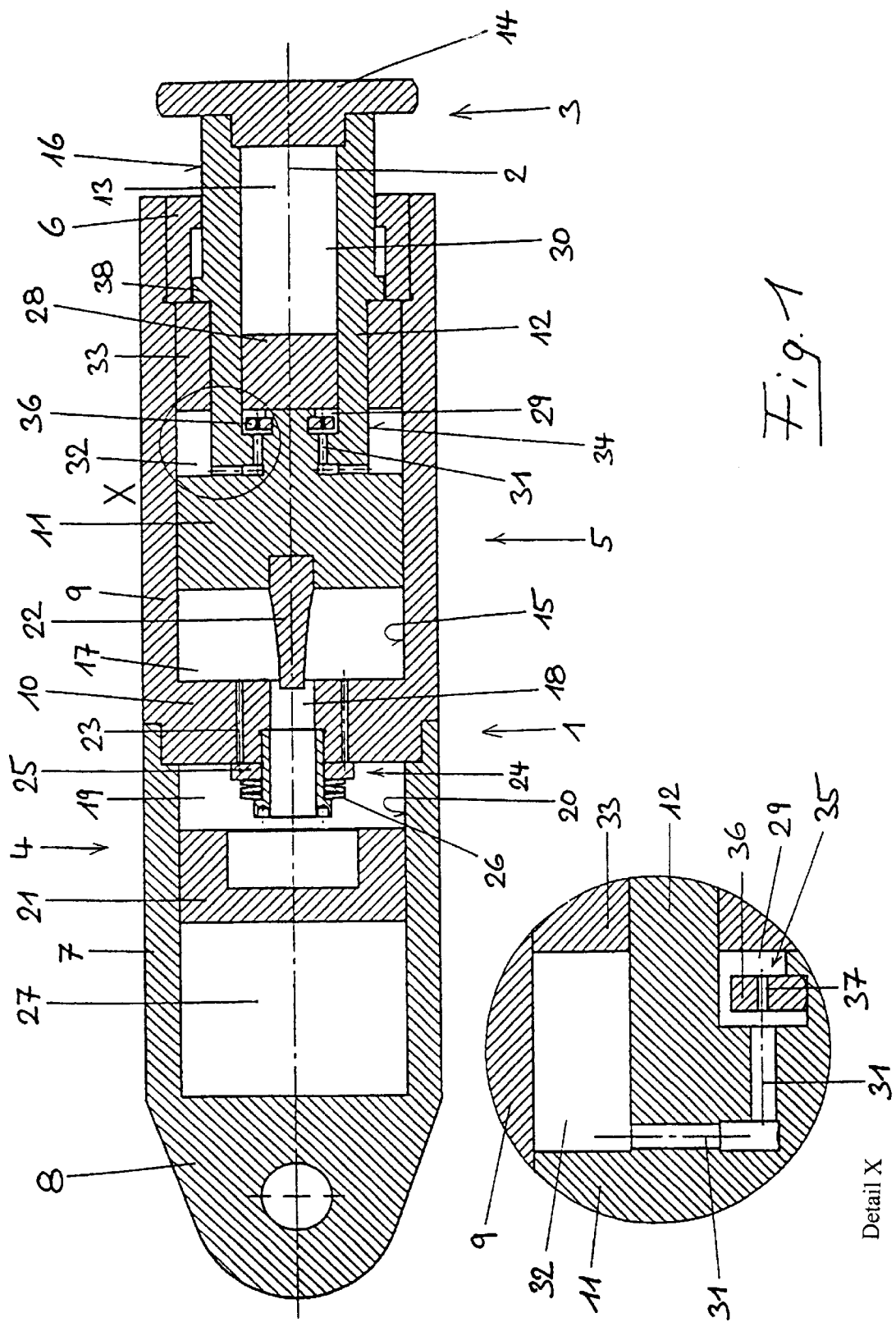

TRACTION/COMPRESSION BUFFER FOR COUPLING DEVICES ON RAIL AND WHEEL-MOUNTED VEHICLES

The present invention relates to a traction/compression buffer for coupling devices on rail and wheel-mounted vehicles, comprising a housing and a piston element, which projects out of said housing on one side and which can be moved out of a zero position in two directions against the resistance of a spring device and a damping device.

Double-acting traction/compression buffers of the type indicated above dampen collision impacts acting in the direction of pressure as well as tractive impacts acting in the direction of traction; in particular, they are used in a variety of vehicles, namely in rail-mounted vehicles. There a heavily damped compression and a weakly damped rebound movement of the piston element upon collision impacts and a weakly damped withdrawal and a strongly damped return movement of the piston element upon tractive impacts is sought. In a known generic traction/compression buffer the housing has a cavity in which is inserted a buffer cartridge that combines a spring device—acting to return the piston element from its compressed position and a damping device—damping reentry of the piston element into the housing—and is acted on by the piston element upon the shove into the housing triggered by collision impacts. For cushioning tractive impacts, by which the piston element is drawn out of the housing, metallic spring rings sliding in axial direction to one another are provided in a ring-shaped cavity formed between the piston element and the housing, while the damping characteristic of particularly the return movement of the piston element into the zero position is defined by the friction between individual spring rings.

The high weight of this known generic traction/compression buffer in particular is disadvantageous. In addition, the known traction/compression buffers are relatively costly.

The object of the present invention, which consists in procuring a traction/compression buffer of the generic type that is distinguished from the prior art by lower weight as well as by lower manufacturing costs, derives from the problems described above.

According to the present invention, this object is accomplished in that for damping the return movement of the piston element out of the position in which it is drawn out of the housing in the direction of the zero position, there is provided a hydraulic damping device which comprises a ring-shaped hydraulic working chamber that surrounds the piston element and is connected to an overflow chamber by at least one overflow channel. In other words, the traction/compression buffer according to the invention is characterized in that a damping device acting hydraulically is provided for damping the return movement of the piston element in the case of tractive impacts. Said hydraulic damping device comprises essentially a ring-shaped hydraulic working chamber, which inside is limited by the piston element and outside preferably by the housing. The volume of this ring-shaped hydraulic working chamber is reduced when the piston element is drawn out of the housing beyond its zero position. Then a damping medium is forced out of the ring-shaped hydraulic working chamber through the at least one overflow channel into an overflow chamber. Upon return of the piston element out of its drawn-out position in the direction of the zero position, caused by the spring device acted on in response to the tractive impact, the damping medium flows out of the overflow chamber through the—preferably narrowed—overflow channels back into the ring-shaped hydraulic working chamber, owing to which the return movement is damped.

The design of the traction/compression buffer according to the invention thus allows the damping device damping the return movement of the piston element upon tractive impacts to be integrated or accommodated in that housing that also accommodates the damping device damping the compression movement of the piston element upon collision impacts. Consequently, efficient traction/compression buffers can be made especially compact and with small dimensions. This immediately results in a weight reduction, as well as in a reduction of manufacturing costs. In addition, for certain applications it is of advantage that, owing to the compact design of the traction/compression buffer according to the invention, the space required for its installation may turn out to be relatively small.

A first preferred refinement of the traction/compression buffer according to the invention is characterized in that the piston element is designed as a cylindrical hollow piston surrounding a cavity, the overflow chamber within the cylindrical cavity being divided by a separating piston guided sealingly displaceable therein. Accommodation of the overflow chamber in the interior of the piston element in turn is of special advantage with regard to compact design of the traction/compression buffer. There the separating piston within the cylindrical cavity surrounded by the hollow piston is deflected according to the overflow volume of the damping medium out of the ring-shaped hydraulic working chamber into the overflow chamber. This may be utilized in connection with another preferred refinement, in that the cylindrical cavity surrounded by the hollow piston is divided by the separating piston into the overflow chamber on one side and a spring chamber on the other side. Accordingly, in this refinement the spring device absorbing tractive impacts is accommodated in the cylindrical cavity surrounded by the hollow piston; it acts on that face of the separating piston that stands opposite the face turned toward the overflow chamber. Basically, a variety of configurations are possible for the structural design of the spring device. Thus, for example, mechanical springs such as bolts and disk springs may be used, as well as elastomer blocks or alternatively gas- pressure springs. Of special advantage, again with regard to the weight as well as to the compactness of the traction/compression buffer according to the invention, is design of the spring device in the form of a gas-pressure spring.

Another preferred refinement of the traction/compression buffer according to the invention is characterized in that the ring-shaped hydraulic working chamber is closed axially by an annular piston that is guided sealingly displaceable on the inner surface of the housing and on the outer surface of the piston element. This form of axial closure of the ring-shaped hydraulic working chamber makes it possible for its volume to be altered only upon withdrawal of the piston element from the housing beyond the zero position, but not upon insertion of the piston element in the housing beyond the zero position. In this way, the damping device acting to dampen the return movement of the piston element upon tractive impacts in no way influences the damping behavior of the damping device damping collision impacts. If, upon collision impacts, the piston element is pushed out of its zero position into the housing, the annular piston follows the movement of the piston element, so that the volume of the ring-shaped hydraulic working chamber does not change. There the annular piston especially preferably is caused to follow by a driver provided on the outer surface of the piston element, which in the zero position of the piston element lies on the face of the annular piston.

According to an alternative, the annular piston may be converted into a cylinder sleeve in which the head part of the piston element is guided sealingly displaceable. In this case the ring-shaped hydraulic working chamber is not limited on the outside by the housing, but rather by the cylinder sleeve connected to the annular piston.

Particularly preferably, a hydraulic damping device is also provided for damping press-in of the piston element into the housing upon collision impacts. According to a preferred refinement of the invention, said damping device comprises a hydraulic high-pressure chamber limited by the piston element, the housing and an intermediate wall, said chamber being connected to a low-pressure chamber by at least one overflow channel. There the housing may in particular comprise a cylindrical cavity that is divided by a separating piston, guided sealingly displaceable, into a spring chamber in which is accommodated the spring device producing return of the pressed-in piston element into its zero position, and the hydraulic low-pressure chamber. Then the at least one overflow channel connecting the high-pressure chamber with the low-pressure chamber is provided in the intermediate wall of the housing. This refinement of the traction/compression buffer according to the invention again permits it to be built especially compactly and easily, and thus to be produced at a low cost.

An especially advantageous refinement is characterized in that the overflow channel is assigned a control element that influences the flow cross section and is connected to the piston element. The position of the control element with respect to the at least one overflow channel thus varies depending upon the position of the piston element relative to the housing. In this way the damping characteristic of the damping device damping collision impacts can be selectively adjusted as a function of the extent to which the piston element moves into the housing, in order to make the damping force as constant as possible over the entire stroke path. Then the control element may in particular be designed as a control pin projecting relatively far into the overflow channel and whose cross section varies in the axial direction. Alternatively to this, the control element may be designed in the form, for example, of a control sleeve having bores that are increasingly closed upon entry of the control sleeve into the overflow channel.

If the housing, in the manner described above, has an intermediate wall delimiting the hydraulic high-pressure chamber, according to another preferred refinement of the invention there is provided at least one overload channel that connects the high-pressure chamber with the low-pressure chamber and to which is assigned an overpressure valve. Such an overload system, comprising an overload channel and a pressure-relief valve, acts to reduce pressure selectively in the high-pressure chamber at extreme conditions, in order to prevent damage to the traction/compression buffer. At the same time, the overload safety system provides an especially compact and light-weight design of the traction/compression buffer according to the invention.

Lastly, according to a refinement of the invention it may be provided that the at least one overflow channel of the hydraulic damping device damping the return movement of the piston element from its position drawn out of the housing into the zero position is assigned a throttle valve acting on one side. The latter reduces the flow cross section of the at least one overflow channel, upon the return flow of the damping medium out of the overflow chamber into the ring-shaped hydraulic working chamber, upon rebound of the piston element out of its drawn-out position into its zero position. Incidentally, when a suitable throttle valve acting on one side is used, the flow cross section of the at least one flow channel can be selected great enough so that the withdrawal movement of the piston element out of the housing, in which the throttle valve is not active, takes place alone, practically undamped, against the force of the corresponding spring device.

In the following, the present invention is explained in detail by two preferred examples shown in the drawing, wherein FIG. 1 shows a longitudinal section through a first embodiment of the traction/compression buffer in zero position of the piston element, FIG. 2, the buffer of FIG. 1 when the piston element is pushed in, FIG. 3, the buffer of FIGS. 1 and 2 when the piston element is withdrawn, and FIG. 4, a longitudinal section through a second preferred embodiment of the traction/compression buffer in zero position of the piston element.

Figure 2:
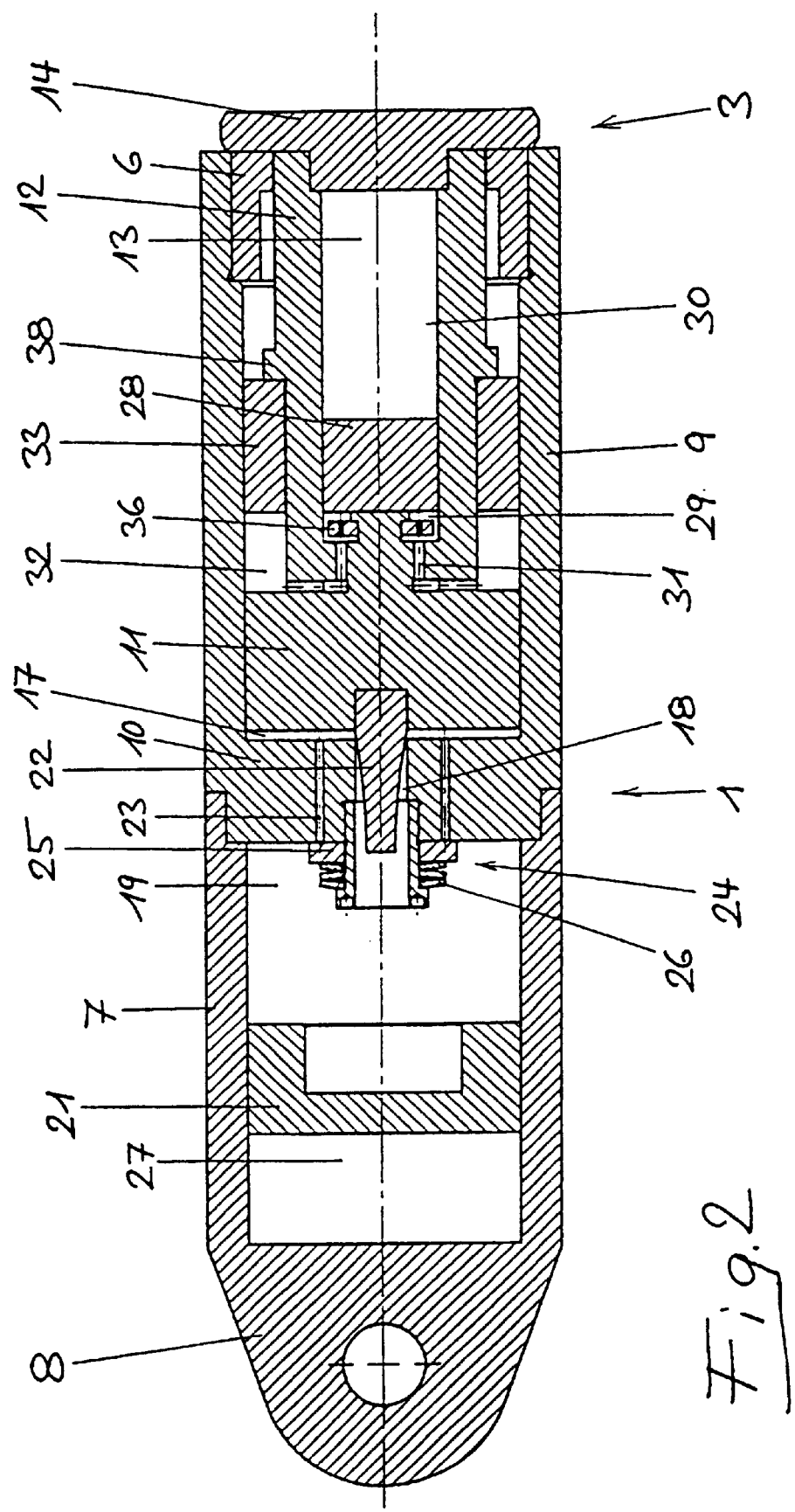
Figure 3:
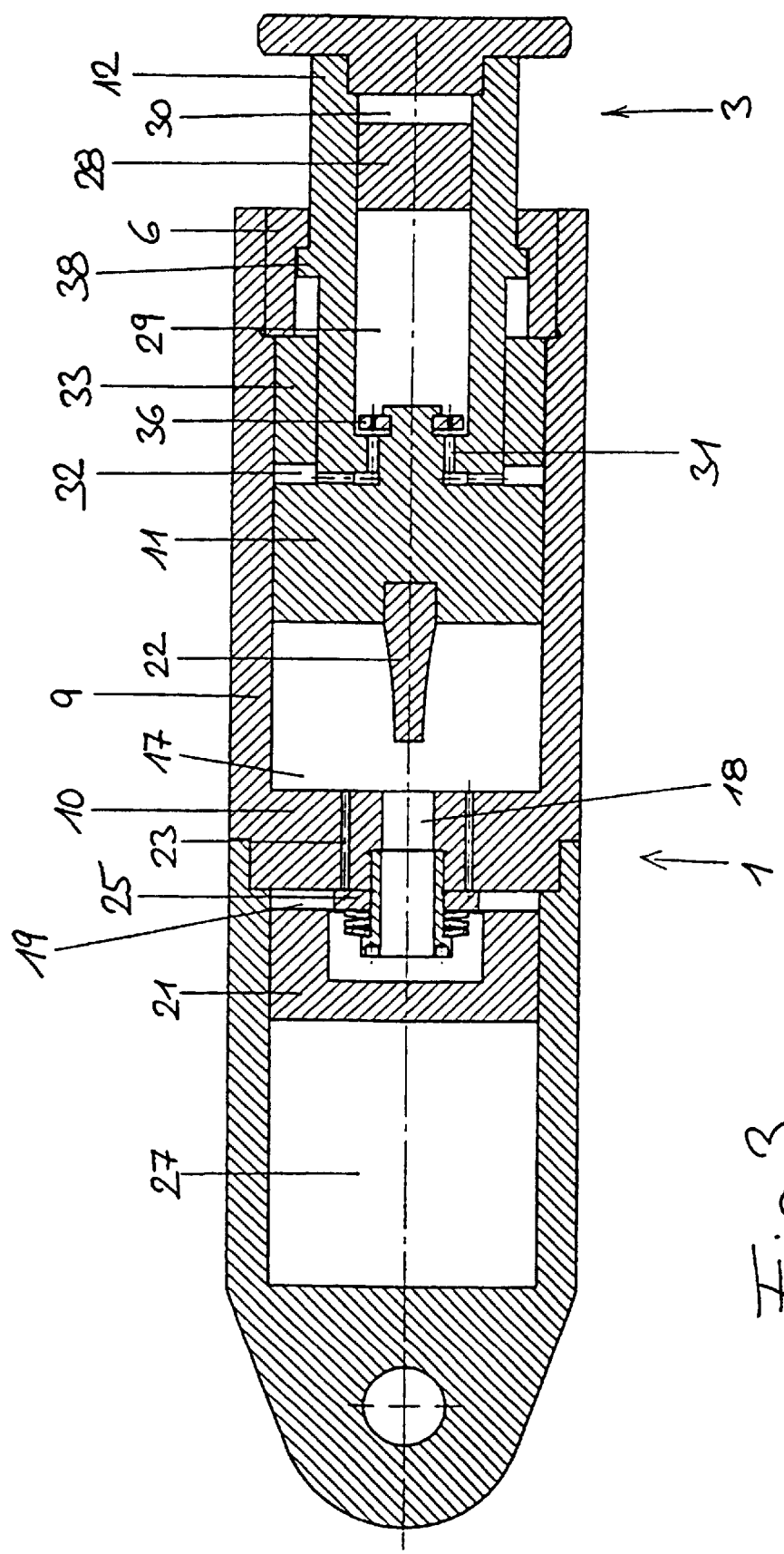

The main components of the traction/compression buffer illustrated in FIGS. 1 to 3 are the housing 1 and the piston element 3 guided displaceable in the housing along the axis 2. The housing 1 consists essentially of an inner section 4, an outer section 5 and an end part 6. The inner section 4 in turn comprises a cylinder section 7 and a connecting section 8. The outer section 5 of the housing 1 comprises a cylinder section 9 and an intermediate wall 10. The end section 6 is inserted at one end into the cylinder section 9 of the outer section 5 of the housing 1.

The piston element 3 comprises a head part 11 and a shaft 12. There a cylindrical cavity 13 is provided in the shaft 12. The latter is closed at the end side by the buffer plate 14.

The piston element 3 is guided displaceable in the housing 1 along the axis 2. For this purpose the head part 11 of the piston element is guided sealingly on the inner wall 15 of the cylinder section 9 of the outer section 5 of the housing 1. In addition, the shaft 12 of the piston element 3 is guided in the region of its outer surface 16 in a corresponding bore of the end part 6.

The intermediate wall 10, the inner surface 15 of the cylinder section 9 of the outer section 5 of the housing 1 and the head part 11 of the piston element 3 define a high-pressure chamber 17. Said chamber is connected to a low-pressure chamber 19 by an overflow channel 18. There the low-pressure chamber 19 is defined by the intermediate wall 10, the inner surface 20 of the cylinder section 7 of the inner section 4 of the housing 1 as well as by a separating piston 21, which in the cylinder section 7 of the inner section 4 of the housing 1 is guided sealingly displaceable along the axis 2. There the high-pressure chamber 17, the overflow channel 18 and the low-pressure chamber 19 form the essential components of the damping device, which acts to damp entry of the piston element 3 into the housing 1 upon collision impacts. For influencing the damping characteristic, a control pin 22 is fastened to the head part 11 of the piston element 3. In the zero position of the piston element 3 illustrated in FIG. 1, this pin projects slightly into the overflow channel 18. As a result of its enlarging diameter, it increasingly narrows the cross section of flow of the overflow channel upon entry of the piston element 3 into the housing, owing to which damping increases.

Not shown in the drawing is a conventionally provided return valve, arranged between the low-pressure chamber and the high-pressure chamber, which opens upon return of the piston element from its position pressed into the housing into its zero position and thus permits a largely undamped return movement of the piston element.

In addition to the overflow channel 18, the high-pressure chamber 17 is connected to the low-pressure chamber 19 by overload channels 23. An overpressure valve 24 arranged in the low-pressure chamber 19 is assigned to these overload channels. The overpressure valve 24 comprises an annular disk 25, which is preloaded by disk springs 26 for seating on the intermediate wall 10. If the difference between the pressures prevailing in the high-pressure chamber 17 on the one hand and in the low-pressure chamber 19 on the other exceeds a predetermined value, the annular disk 25 lifts from the intermediate wall 10 and in this way opens the overload channels 23.

The cylinder section 7 of the inner section 4 of the housing 1 and the separating piston 21 in addition define a spring chamber 27. This spring chamber 27 is filled with gas under pressure (for example, 5–20 bar at zero position of the piston element), so that a gas spring acts on the separating piston 21, which spring, owing to the hydraulic coupling of the low-pressure chamber 19 and the high-pressure chamber 17, in turn exerts a returning force on the compressed piston element 3 (FIG. 2).

In the cylindrical cavity 13 provided in the shaft 12 of the piston element 3, a separating piston 28 is guided sealingly displaceable along the axis 2. This separating piston 28 divides the cylindrical cavity 13 into an overflow chamber 29 and a spring chamber 30. There the overflow chamber is connected by overflow channels 31 to a ring-shaped hydraulic working chamber 32, which surrounds the piston element 3 on the outside in the region of the shaft 12. The ringshaped hydraulic working chamber 32, incidentally, is limited by the head part 11 of the piston element 3, the inner surface 13 of the cylinder section 9 of the outer section 5 of the housing 1 and an annular piston 33, which is guided sealingly on the inner surface 15 of the cylinder section 9 of the outer section 5 of the housing 1 on the one hand and the outer surface 34 of the shaft 12 of the piston element 3 on the other. When the piston element 3 is drawn out of the housing 1 (cf. FIG. 3) the volume of the ring-shaped hydraulic working chamber 32 is reduced. The damping medium found in said chamber is forced through the overflow channels 31 into the overflow chamber 29, owing to which the separating piston 28 is displaced within the cylindrical cavity 13. At the same time the overflow chamber 29 increases in size at the expense of the spring chamber 30, which is filled with gas under high pressure (for example, 100–150 bar at zero position of the piston element, i.e., considerably higher than the pressure in the spring chamber 27). The increasing pressure of the gas enclosed in the spring chamber 30 exerts a returning force on the separating piston. 28 which, by increasing displacement of the damping medium out of the overflow chamber 29 into the ring-shaped hydraulic working chamber 32, causes entry of the withdrawn piston element 3 (FIG. 3) into its zero position (FIG. 1).

At the same time the damping characteristic is controlled by a throttle valve designed as a disk valve 35. For this purpose, the valve plate 36 has bores 37, which are aligned coaxial to the axial sections of the overflow channels 31, but have a smaller diameter than the latter. There the valve plate is designed axially displaceable between two positions in such a way that the damping medium need only pass through the bores 37 in the return flow out of the overflow chamber 29 into the ring-shaped hydraulic working chamber 32, but in reverse flow not through the overflow channels 31.

In the zero position of the piston element 3 (FIG. 1) the annular piston 33 rests with its face turned away from the ring-shaped hydraulic working chamber 32 on the face of the end part 6 as well as on a driver 38, which is provided in the form of a collar on the outer surface of the shaft 12 of the piston element 3. If the piston element 3 is pressed into the housing 1 (FIG. 2) upon a collision impact, the annular piston 33, as a result of its seating on the driver 38, is displaced together with the piston element 3. In this way the volume of the ring-shaped hydraulic working chamber 32 remains constant in the zero position during entry of the piston element and its subsequent rebound into the zero position. Thus damping of collision impacts takes place exclusively by the damping device comprising the high-pressure chamber 17, the overflow channel 18 and the low-pressure chamber 19. If, on the other hand, the piston element 3 is drawn out of the housing 1 upon a tractive impact (FIG. 3), the annular piston 33 is supported on the end part 6, owing to which, as already explained, the volume of the ring-shaped hydraulic working chamber 32 is reduced with displacement of damping medium into the overflow chamber 29. As a comparison of FIGS. 1 and 3 shows, displacement of damping medium from the low-pressure chamber 19 into the high-pressure chamber 17 by the overflow channel 18 also takes place. However, because of the great flow cross section of the overflow channel 18 when the control pin 22 is withdrawn, the damping influence is comparatively small.

Figure 4:
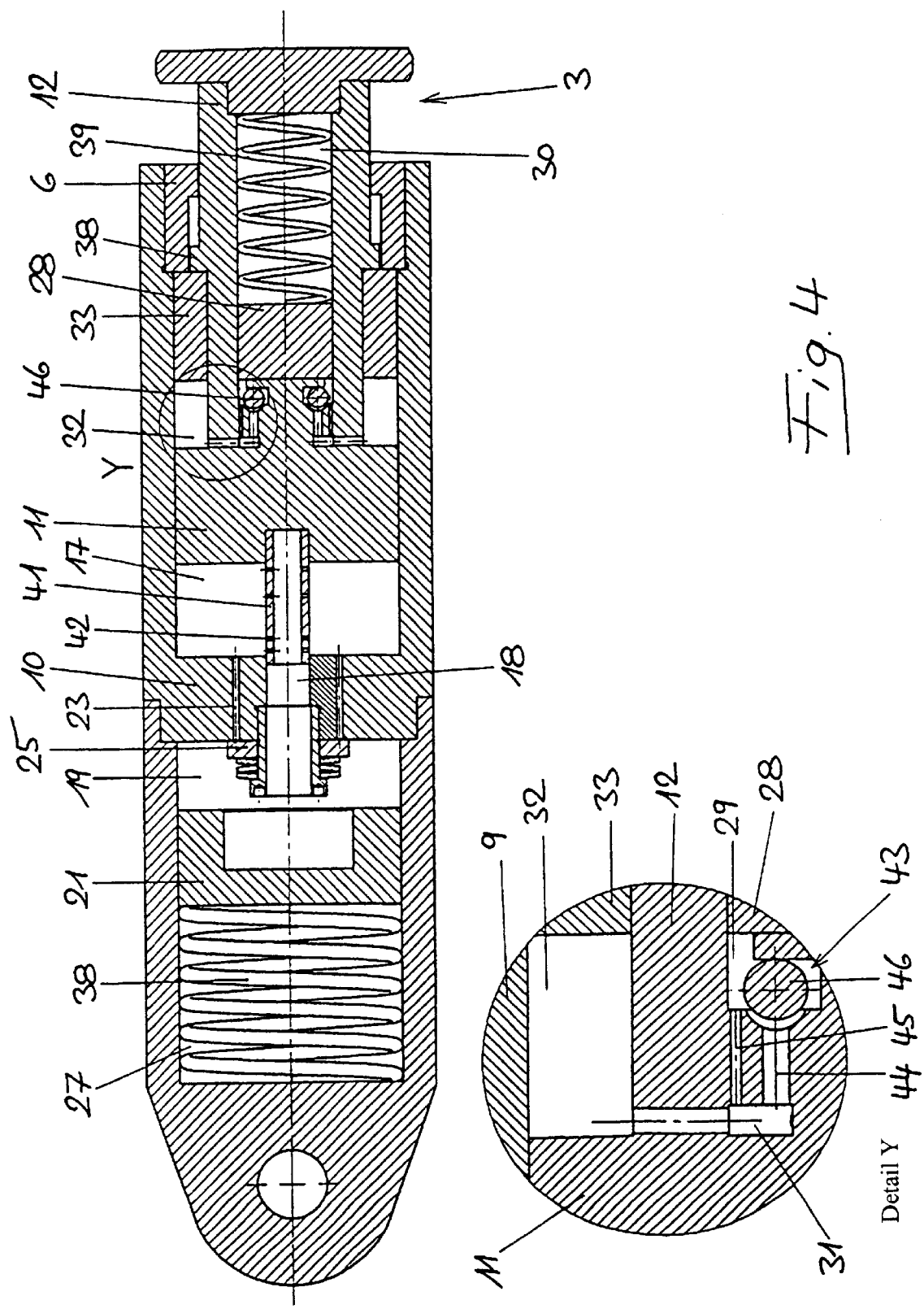

With respect to its basic design, the traction/compression buffer shown in FIG. 4 corresponds to the buffer of FIGS. 1 to 3. To avoid repetition, reference is made to the corresponding embodiments. Only the differences are explained below.

Thus, for one thing, helical springs 39 and 40 are provided in the two spring chambers 27 and 30 in order to provide the required restoring forces for return of the piston element 3 to its zero position.

In addition, instead of the control pin 22 of FIGS. 1 to 3, a control sleeve 41 is provided, which depending upon the movement of the piston element 3 dips comparatively deeply into the overflow channel 18. The control sleeve has a plurality of bores 42, which connect the interior of the control sleeve 41 with the high-pressure chamber 17. Depending upon how far the control sleeve 41 dips into the intermediate wall 10, a comparatively great number of bores 42 is closed off, owing to which the flow cross section available for passage of damping medium varies correspondingly.

Lastly, instead of the disk valve 35 shown in FIGS. 1 to 3, a ball valve 43 is provided. The overflow channels 31 comprise main bores 44 and secondary bores 45. Upon tractive impacts damping medium from the ring-shaped hydraulic working chamber 32 can reach the overflow chamber 29 via the main bores 44 as well as via the secondary bores 45. In contrast, upon reverse direction of flow the balls 46 of the ball valve 43 close off the main bores 44, so that the flow cross section is limited to the secondary bores 45.

For clarification only, let it be added that the statement according to which, for example, the head part 11 of the piston element 3 and the separating piston 21 are guided in the housing 1 must under no circumstances be interpreted to mean that there is necessarily a direct contact of the respective parts with each other, nor that a cylinder sleeve or the like fixedly set in the housing is to be provided. The same applies, mutatis mutandis, to guidance of the annular piston 33 in the housing 1 and guidance of the separating piston 28 in the piston element 3.

What is claimed is:

1. Traction/compression buffer for coupling devices on rail and wheel-mounted vehicles, comprising:

a housing and a piston element that projects out of said housing on one side and which can be moved out of a zero position in two directions against the resistance of a spring device and a damping device, wherein for damping the return movement of the piston element out of the position in which it is drawn out of the housing in the direction of the zero position, there is provided a hydraulic damping device which comprises a ring-shaped hydraulic working chamber that surrounds the piston element and is connected to an overflow chamber by at least one overflow channel, wherein said ring-shaped hydraulic working chamber is closed axially by an annular piston that is guided sealingly on an inner surface of the housing and on an outer surface of the piston element.

2. Traction/compression buffer according to claim 1, wherein the piston element is a hollow piston surrounding a cylindrical cavity, the overflow chamber within the cylindrical cavity being divided by a separating piston guided sealingly displaceable therein.

3. Traction/compression buffer according to claim 2, wherein the separating piston divides the cylindrical cavity surrounded by the hollow piston into the overflow chamber and a spring chamber.

4. Traction/compression buffer according to claim 1, wherein an outer surface of the piston element has a driver which, when the piston element is pushed in out of its zero position, follows the annular piston.

5. Traction/compression buffer according to claim 1, wherein for damping press-in of the piston element into the housing there is provided a hydraulic damping device that comprises a hydraulic hight-pressure chamber limited by the piston element, the housing and an intermediate wall.

6. Traction/compression buffer according to claim 5, wherein the housing comprises a cylindrical cavity that is divided by a separating piston, guided sealingly displaceable therein, into a spring chamber and a hydraulic low-pressure chamber, the low-pressure chamber being connected to the high-pressure chamber by at least one overflow channel.

7. Traction/compression buffer according to claim 6, wherein the at least one overflow channel is assigned a control element that influences the flow cross section and is connected to the piston element.

8. Traction/compression buffer according to claim 5, wherein the intermediate wall has at least one overload channel that connects the high-pressure chamber to a low-pressure chamber and to which is assigned an overpressure valve.

9. Traction/compression buffer according to claim 1, wherein the at least one overflow channel of the hydraulic damping device at damps drawing out of the piston element from the housing is assigned a throttle valve acting on one side.

* * * * *